(12) United States Patent
Zambetti et al.

(10) Patent No.: US 9,097,592 B2
(45) Date of Patent: Aug. 4, 2015

(54) TEMPERATURE SENSING DEVICE AND METHOD OF GENERATING A SIGNAL REPRESENTING THE TEMPERATURE OF AN ENVIRONMENT

(75) Inventors: Osvaldo Enrico Zambetti, Milan (IT); Dario Zambotti, Vimodrone (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 533 days.

(21) Appl. No.: 13/601,464

(22) Filed: Aug. 31, 2012

(65) Prior Publication Data
US 2013/0058378 A1    Mar. 7, 2013

(30) Foreign Application Priority Data
Sep. 5, 2011    (IT) .............. MI2011A1591

(51) Int. Cl.
*G01K 7/24*    (2006.01)
*G01K 7/00*    (2006.01)
*G01K 7/25*    (2006.01)
*G01K 7/16*    (2006.01)
*G01K 7/22*    (2006.01)

(52) U.S. Cl.
CPC .. *G01K 7/24* (2013.01); *G01K 7/25* (2013.01); *G01K 7/00* (2013.01); *G01K 7/16* (2013.01); *G01K 7/22* (2013.01)

(58) Field of Classification Search
CPC ............. G01K 7/00; G01K 7/16; G01K 7/22; G01K 7/24; G01K 7/25
USPC ..................... 374/183, 185; 327/512; 323/315
See application file for complete search history.

(56) References Cited

U.S. PATENT DOCUMENTS

| | | | |
|---|---|---|---|
| 6,700,365 B2 * | 3/2004 | Isham et al. ................ | 323/317 |
| 7,439,601 B2 * | 10/2008 | Hartley ........................ | 257/467 |
| 7,808,068 B2 * | 10/2010 | Hartley ........................ | 257/467 |
| 9,018,930 B2 * | 4/2015 | Zambetti ...................... | 323/294 |
| 2003/0107358 A1 * | 6/2003 | Isham et al. ................ | 323/283 |
| 2006/0056485 A1 * | 3/2006 | Hartley ........................ | 374/170 |
| 2008/0111565 A1 * | 5/2008 | Ausserlechner et al. ..... | 324/727 |
| 2009/0002062 A1 * | 1/2009 | Hartley ........................ | 327/539 |
| 2009/0257164 A1 | 10/2009 | Ikeuchi et al. | |
| 2010/0259313 A1 * | 10/2010 | Li et al. ...................... | 327/512 |
| 2012/0161741 A1 * | 6/2012 | Zambetti ...................... | 323/294 |

* cited by examiner

*Primary Examiner* — Lisa Caputo
*Assistant Examiner* — Jonathan Dunlap
(74) *Attorney, Agent, or Firm* — Seed IP Law group PLLC

(57) ABSTRACT

A sensing device includes a first current mirror configured to mirror a current flowing through a thermistor, a second current mirror configured to mirror a current flowing through a reference resistor a comparator configured to compare voltages on the thermistor and the resistor, and a counter configured to generate a control signal representative of a temperature difference based on the comparison. The control signal controls a mirroring ratio of the second current mirror. The sensing device may be employed to generate a droop current of a voltage regulator.

30 Claims, 4 Drawing Sheets

TEMPERATURE SENSING DEVICE AND METHOD OF GENERATING A SIGNAL REPRESENTING THE TEMPERATURE OF AN ENVIRONMENT

BACKGROUND

1. Technical Field

This disclosure relates to temperature sensors and more particularly to a device adapted to generate an output signal representing the difference between a sensed temperature of an environment and a reference temperature and a related method.

2. Description of the Related Art

CPU for PCs, WORKSTATIONS and SERVERS typically need very sophisticated supply control mechanisms. Their power supplies typically must meet high precision requirements both in stand-by conditions as well as in conditions of load transients. It is known that, in order to reduce costs of the output filter of these systems, "voltage position" techniques, called also "droop function" or "load line regulation", based on programming the output resistance of the power supply voltage regulator, are often used.

In order to prevent avoidable power dissipations and to sense the output current in a sufficiently refined and continuous manner, the parasitic conduction resistance DCR of the output inductor is typically used as sense resistance.

FIG. 1 depicts a simplified block diagram of a typical three-phase buck voltage regulator 100. The voltage regulator 100 comprises an interleaving oscillator 102 configured to generate mutually out-of-phase ramp signals RAMP1, RAMP2, . . . , RAMPN, and a multiphase pulse-width-modulation (PMW) generator 104 configured to generate mutually out-of phase PMW signals PWM1, PWM2, . . . PWMN. The voltage regulator 100 comprises a plurality of MOS drivers 106 each configured to drive a power MOS output stage 116. Each power MOS output stage 116 is coupled to a supply voltage $V_{IN}$ and a ground and configured to provide a respective current $I_{L1}$, $I_{L2}$, . . . $I_{LN}$ through a respective output inductor L1, L2, LN to an output $V_{OUT}$. The voltage regulator 100 has a capacitor $C_{OUT}$ coupled between the output $V_{OUT}$ and the ground.

In these multiphase systems, the output current of the regulator is sensed in order to generate the desired load line. Moreover, information regarding the current flowing through each channel, reference currents $I_{INFO1}, I_{INFO2}, \ldots I_{INFON}$ are used to implement the so-called current sharing between the phases of the system and equalizing the currents flowing throughout the phase windings to reduce stresses and damages to components. As illustrated, reference currents $I_{INFO1}, I_{INFO2}, \ldots I_{INFON}$ are provided to a current sensing control 114 configured to generate voltage signals $V_{BALANCE\_1}$, $V_{BALANCE\_2}, \ldots V_{BALANCEN}$ corresponding to the desired reference currents, which are added to an error signal COMP and provided to the multiphase PWM generator 104. An error amplifier 108 is configured to generate the error signal COMP, and is coupled to a reference voltage REF, a current IDROOP proportional to a current supplied to a load, a feed back resistance ZFB 110 and a resistance ZF 112.

The main problem in sensing the current on the conduction resistance DCR of a winding is that its resistance depends on temperature. The temperature coefficient α of copper is about 0.39%, thus even small temperature fluctuations may generate relevant errors in sensing the delivered current.

The voltage read on the winding, for example through TCM (Time Constant Matching) techniques, well known in literature, is as follows:

$$V_{DCR1} = I_L \cdot DCR_{25} \cdot [1 + \alpha(T-25)]$$

and the current ISENSE read for a single channel is $$I_{SENSE1} = I_L \cdot \frac{DCR_{25}}{R_G} \cdot [1 + \alpha(T-25)]$$

being $R_G$ the design resistance of the current sensing.
Being $$I_{INFO} = I_L \cdot \frac{DCR_{25}}{R_G}$$

then $$I_{SENSE1} = I_{INFO} \cdot [1 + \alpha(T-25)]$$

For temperature compensating N currents, an equal number of thermistors, for example of NTC (Negative Temperature Coefficient) type, would be used. However, because NTC thermistors are relatively expensive, a single NTC sensing for the sum of the currents (IDROOP) is generally performed such to compensate an average temperature of the N phases. In order to do that without using additional pins, the thermistor is introduced in the compensation network, in place of or combined with the feedback resistance ZFB, as shown in FIG. 2, that realizes the so-called droop function.

In FIG. 2, the block MODULATOR indicates generically the PWM signal generator and the drivers of the power stages, the block CURRENT AND THERMAL MONITOR sense the thermally compensated output current and the working temperature, and converts them, for example in digital form, for outputting the reference currents, and the current ISENSE is the sum of the currents of all the phases: $I_{INFO1}, I_{INFO2}, \ldots I_{INFON}$.

BRIEF SUMMARY

This cost saving expedient of FIG. 2 has many drawbacks:
- compensation and thus stability of the system depend on temperature;
- should another thermally compensated temperature signal be needed for another use (for example the monitoring of the output current IMON), it is necessary to install an additional thermistor;
- should a motherboard temperature measure (TM) be required, a further additional thermistor is needed, with relevant increase of costs.

A circuit that obviates to these drawbacks, disclosed by Intersil, contemplates the use of a single NTC. The solution is based on the mapping of the temperature characteristic of a known sensor. Once the temperature characteristic is known, the sensed current is corrected and this correction (that will depend upon the temperature) may be used for the various operations to be performed on the sensed current (droop function, current monitor and current sharing).

A drawback of this solution consists in that the characteristic of the sensor must be known and mapped on silicon in order to gather the correct temperature value.

It would be desirable a device for sensing temperature increases in an environment, that uses a single NTC, which need not be inserted in any loop, adapted to generate an output signal representing these temperature increments that may be replicated and distributed for temperature compensating any current in switching voltage regulators in any functioning condition, even when the current to be compensated of the switching voltage regulator is null.

In an embodiment, a sensing device is adapted to generate an output signal representing temperature differences between the temperature of an environment and a reference temperature. In an embodiment, the device is adapted to be connected to a single thermistor immersed in an environment, the temperature of which is to be measured, and to a reference resistor, and to generate the desired output signal in digital form.

In an embodiment, this output signal is generated by:
applying a constant voltage on the thermistor;
mirroring a first current flowing throughout the thermistor such as to cross a first sense resistor;
applying a constant voltage on a reference resistor;
mirroring a second current flowing throughout reference resistor such as to cross a second sense resistor;
comparing the voltages on the first and second sense resistors and generating a logic comparison signal;
increasing or decreasing a counting in function of the value of the logic comparison signal; and
increasing or decreasing the mirroring ratio of the second current mirror according to the counting.

In an embodiment, a sensing device may be installed in a switching voltage regulator for generating a droop current representing the current flowing throughout a winding of the voltage regulator, substantially independent from temperature fluctuations of the winding.

In an embodiment, the thermistor may be a NTC resistor.

In an embodiment, a sensing device, adapted to generate an output signal representing temperature differences between the temperature of an environment and a reference temperature, comprises: a first circuit adapted to apply a constant voltage on a thermistor installed in said environment, said first circuit including also a first sense resistor and a first current mirror input with a first current flowing throughout the thermistor and adapted to mirror said first current throughout said first sense resistor; a second circuit adapted to apply said constant voltage on a reference resistor, said second circuit including also a second sense resistor and a second current mirror input with a second current flowing throughout the reference resistor and adapted to mirror said second current throughout said second sense resistor, the mirroring ratio of said second current mirror being adjustable by said output signal; a comparator of the voltages on said sense resistors first and second, adapted to generate a logic comparison signal, an up-down counter of pulses controlled by said logic comparison signal of a clock signal, adapted to increase or decrease its counting depending upon the logic value of said logic comparison signal, said output signal representing said counting. In an embodiment, said first and second sense resistors are identical to each other and said reference resistor matches the value of said thermistor at said reference temperature. In an embodiment, said first circuit further comprises: a first operational amplifier input with said constant voltage and a first feedback voltage available on a first terminal of the device, on which said thermistor may be connected, a first transistor controlled in a conduction state by said first operational amplifier, connected to said first terminal such to force a current throughout said thermistor, said first current mirror being adapted to receive the current flowing throughout said first transistor and to mirror it throughout said first sense resistor; said second circuit further comprises: a second operational amplifier input with said constant voltage and a second feedback voltage available on a second terminal of the device, on which said reference resistor may be connected, a second transistor controlled in a conduction state by said second operational amplifier, connected to said second terminal such to force a current throughout said reference resistor, said second current mirror being adapted to receive the current flowing throughout said second transistor and to mirror it throughout said second sense resistor.

In an embodiment, a method of generating an output signal representing temperature differences between the temperature of an environment and a reference temperature, using a thermistor being installed in said environment, comprises the steps of: applying a constant voltage on said thermistor; mirroring a first current flowing throughout said thermistor such to cross a first sense resistor; applying a constant voltage on a reference resistor; mirroring a second current flowing throughout reference resistor such to cross a second sense resistor; comparing the voltages on said sense resistors first and second and generating a logic comparison signal; increasing or decreasing a counting in function of the value of said logic comparison signal; increasing or decreasing the mirroring ratio of said second current mirror according to said counting.

In an embodiment, a switching voltage regulator having a circuit adapted to generate a sense current representative of the current flowing throughout a winding of the voltage regulator, the voltage regulator comprising a thermistor thermally coupled to said winding, characterized in that the voltage regulator is adapted to generate a droop current as a compensated replica of said sense current from temperature fluctuations of said winding and in that it further comprises a sensing device as described herein connected to said thermistor and to a reference resistor, adapted to generate said output signal representing temperature differences between the temperature of the thermistor and a reference temperature; a third current mirror with an adjustable mirroring ratio reciprocal of the mirroring ratio of said second current mirror and controlled by said output signal, connected such that the mirroring ratio of said third current mirror is adjustable by said output signal and such to be input with said sense current and to deliver said droop current.

In an embodiment, a sensing device comprises: circuitry configured to apply a voltage to a thermistor; a first sense resistor; a first current mirror configured to mirror a first current flowing through the thermistor through said first sense resistor; circuitry configured to apply said voltage to a reference resistor; a second sense resistor; a second current mirror configured to mirror a second current flowing through the reference resistor through said second sense resistor; a comparator configured to compare voltages on said first and second sense resistors to generate a comparison signal; and output circuitry configured to receive the comparison signal and to generate an output signal representative of a difference between a temperature of an environment of the thermistor and a reference temperature, wherein a mirroring ratio of the second current mirror is configured to vary based on the output signal. In an embodiment, the output circuitry comprises an up-down counter configured to receive a clock signal and to increase or decrease a count based on clock pulses and a value of the comparison signal. In an embodiment, said first and second sense resistors are substantially identical to each other and said reference resistor has a resistance matching a resistance of said thermistor at said reference temperature. In an embodiment, said circuitry configured to apply the voltage to the thermistor comprises: a first operational amplifier configured to receive a constant voltage and a first feedback voltage available on a first terminal configured to couple to the thermistor; and a first transistor controlled in a conduction state by said first operational amplifier and coupled between the first current mirror and the first terminal. In an embodiment, said circuitry configured to apply the voltage to the reference resistor comprises: a second operational amplifier configured to receive said constant voltage and a second feedback voltage available on a second terminal configured to coupled to said reference resistor; and a second transistor controlled in a conduction state by said second operational amplifier and coupled between the second current mirror and the second terminal. In an embodiment, the output circuitry comprises an up-down counter configured to receive a clock signal and to increase or decrease a count based on clock pulses and a value of the comparison signal. In an embodiment, the comparison signal is a logic signal. In an embodiment, a mirroring ratio of the first current mirror is 1 to 1. In an embodiment, the sensing device further comprises: a third current mirror having a mirroring ratio configured to vary based on the output signal.

In an embodiment, a method comprises: applying a voltage to a thermistor in an environment; mirroring a first current flowing through said thermistor to a first sense resistor; applying a voltage to a reference resistor; mirroring a second current flowing through the reference resistor to a second sense resistor; comparing the voltages on said first and second sense resistors and generating a comparison signal; generating a signal representative of a difference between a temperature of the environment and a reference temperature based on the comparison; and adjusting a mirroring ratio of said second current based on said signal representative of the temperature difference. In an embodiment, the comparison signal is a logic signal and the generating the signal representative of the temperature difference comprises incrementing or decrementing a counter based on the logic signal and a clock signal. In an embodiment, said first and second sense resistors are substantially identical to each other and said reference resistor has a resistance equal to a resistance of said thermistor at said reference temperature. In an embodiment, applying the voltage to the thermistor comprises: applying a constant voltage and a first feedback voltage to a first operational amplifier, wherein the first feedback voltage is a voltage across the thermistor; and applying an output of the first operational amplifier to control a first transistor coupled between the first current mirror and the thermistor. In an embodiment, applying the voltage to the reference resistor comprises: applying the constant voltage and a second feedback voltage to a second operational amplifier, wherein the second feedback voltage is a voltage across the reference resistor; and applying an output of the second operational amplifier to control a second transistor coupled between the second current mirror and the reference resistor. In an embodiment, the comparison signal is a logic signal and the generating the signal representative of the temperature difference comprises incrementing or decrementing a counter based on the logic signal and a clock signal. In an embodiment, the method further comprises controlling a voltage regulator based on the signal representative of the temperature difference. In an embodiment, the controlling the voltage regulator comprising generating a droop current based on the signal representative of the temperature difference and a sensed current provided by the voltage regulator.

In an embodiment, a system comprises: a voltage regulator having an inductor; a thermistor thermally coupled to the inductor; and a sensing device coupled to the voltage regulator and including: circuitry configured to apply a voltage to the thermistor; a first sense resistor; a first current mirror configured to mirror a first current flowing through the thermistor through said first sense resistor; circuitry configured to apply said voltage to a reference resistor; a second sense resistor; a second current mirror configured to mirror a second current flowing through the reference resistor through said second sense resistor; a comparator configured to compare voltages on said first and second sense resistors to generate a comparison signal; and output circuitry configured to receive the comparison signal and to generate an output signal representative of a difference between a temperature of the environment and a reference temperature, wherein a mirroring ratio of the second current mirror is configured to vary based on the output signal. In an embodiment, the comparison signal is a logic signal and the output circuitry comprises an up-down counter configured to receive a clock signal and to increase or decrease a count based on clock pulses and a value of the comparison signal. In an embodiment, said first and second sense resistors are substantially identical to each other and said reference resistor has a resistance matching a resistance of said thermistor at said reference temperature. In an embodiment, said circuitry configured to apply the voltage to the thermistor comprises: a first operational amplifier configured to receive a constant voltage and a first feedback voltage available on a first terminal configured to couple to the thermistor; and a first transistor controlled in a conduction state by said first operational amplifier and coupled between the first current mirror and the first terminal; and said circuitry configured to apply the voltage to the reference resistor comprises: a second operational amplifier configured to receive said constant voltage and a second feedback voltage available on a second terminal configured to coupled to said reference resistor; and a second transistor controlled in a conduction state by said second operational amplifier and coupled between the second current mirror and the second terminal. In an embodiment, the system comprises: a third current mirror having a mirroring ratio configured to vary based on the output signal. In an embodiment, the third current mirror is configured to mirror a sensed current representative of a current flowing through the voltage regulator. In an embodiment, the sensed current is representative of a current flowing through the inductor. In an embodiment, the sensed current is representative of a current supplied by the voltage regulator to a load. In an embodiment, the third current mirror is configured to generate a droop current to control the voltage regulator. In an embodiment, the mirroring ratio of the third current mirror is a reciprocal of the mirroring ratio of the second current mirror.

In an embodiment, a system comprises: means for generating a first signal based on a current flowing through a thermistor; means for generating a second signal based on a current flowing through a reference resistor; means for generating a comparison signal based on the first and second signals; and means for generating a control signal to control a mirroring ratio of the means for generating the second signal based on the comparison signal, wherein the control signal is indicative of a temperature difference. In an embodiment, the system further comprises: a voltage regulator; and means for generating a droop current based on the control signal and a current representative of a current provided by the voltage regulator. In an embodiment, the temperature difference is a difference between a temperature of an environment of the voltage regulator and a reference temperature.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, inductors, transistors, thermistors, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

An embodiment of a sensing device uses a single thermistor, preferably a NTC resistor, for generating on a terminal $T_{SEN}$ a signal representing temperature differences between the temperature of an environment in which the thermistor is immersed and a reference temperature.

Figure 1:
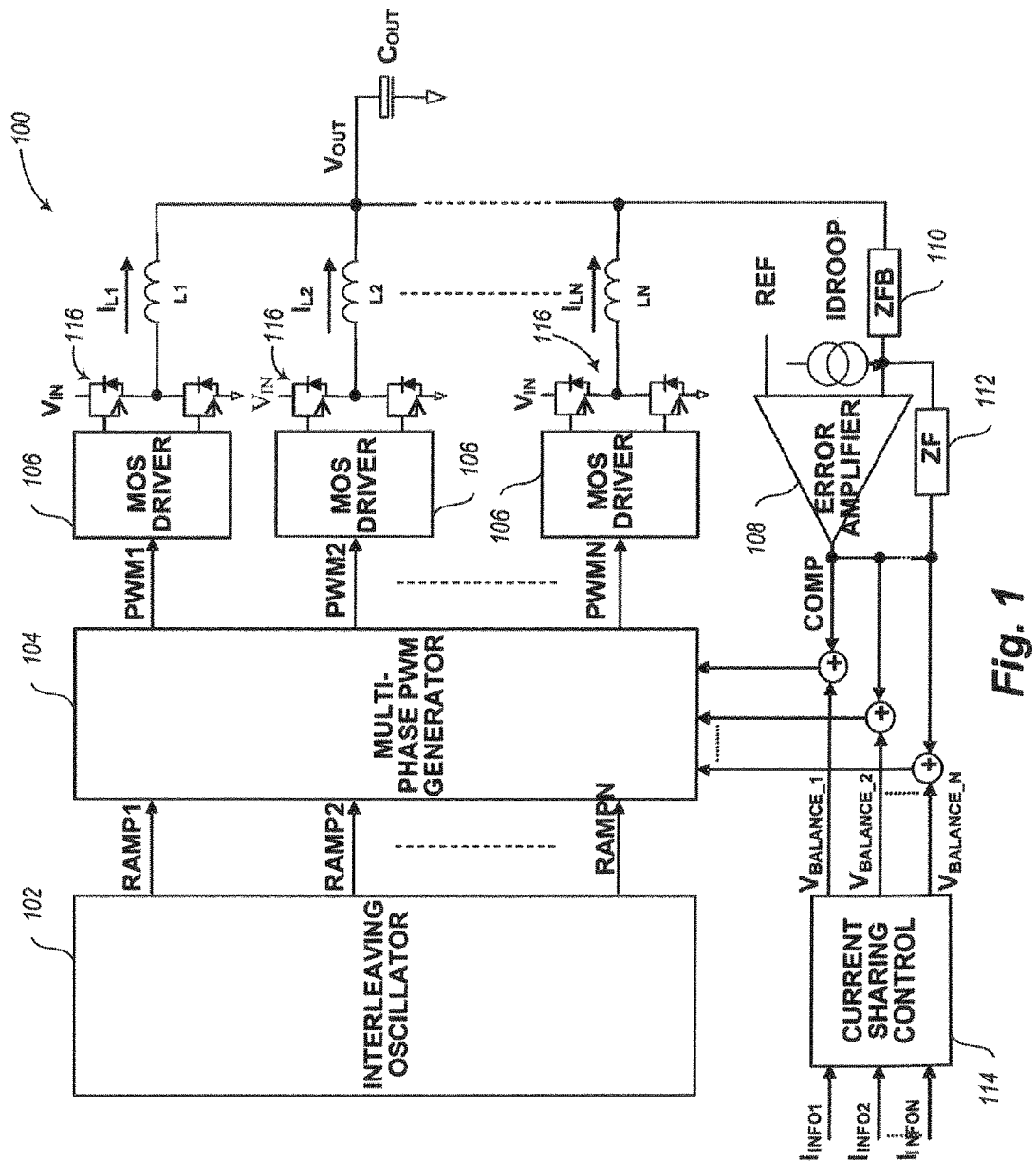
FIG. 1 depicts a typical multi-phase voltage regulator.
Figure 2:
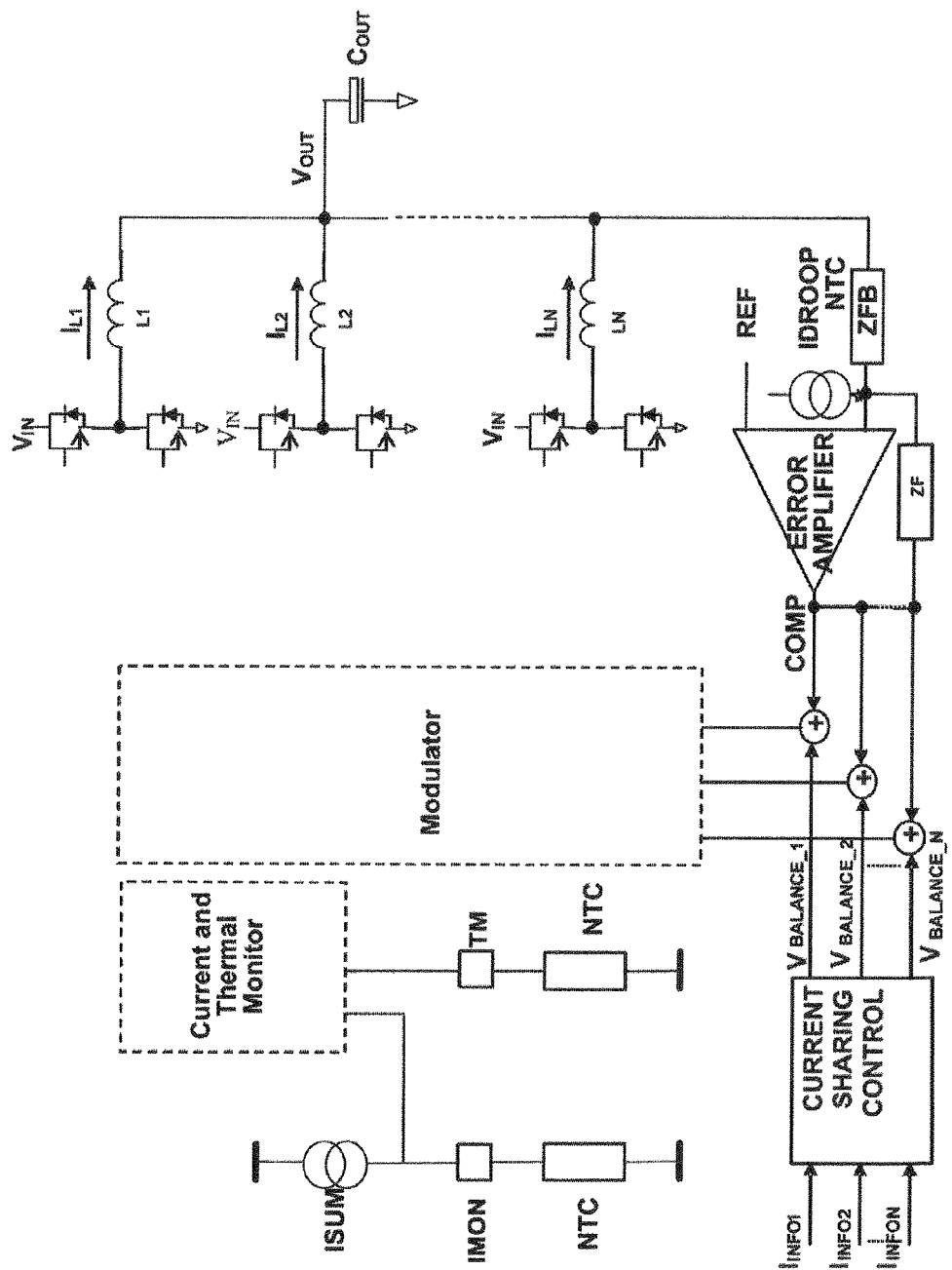
FIG. 2 depicts a known multi-phase voltage regulator using two further thermistors, in which the feedback resistance $Z_{FB}$ contains or is composed of a further thermistor.
Figure 3:
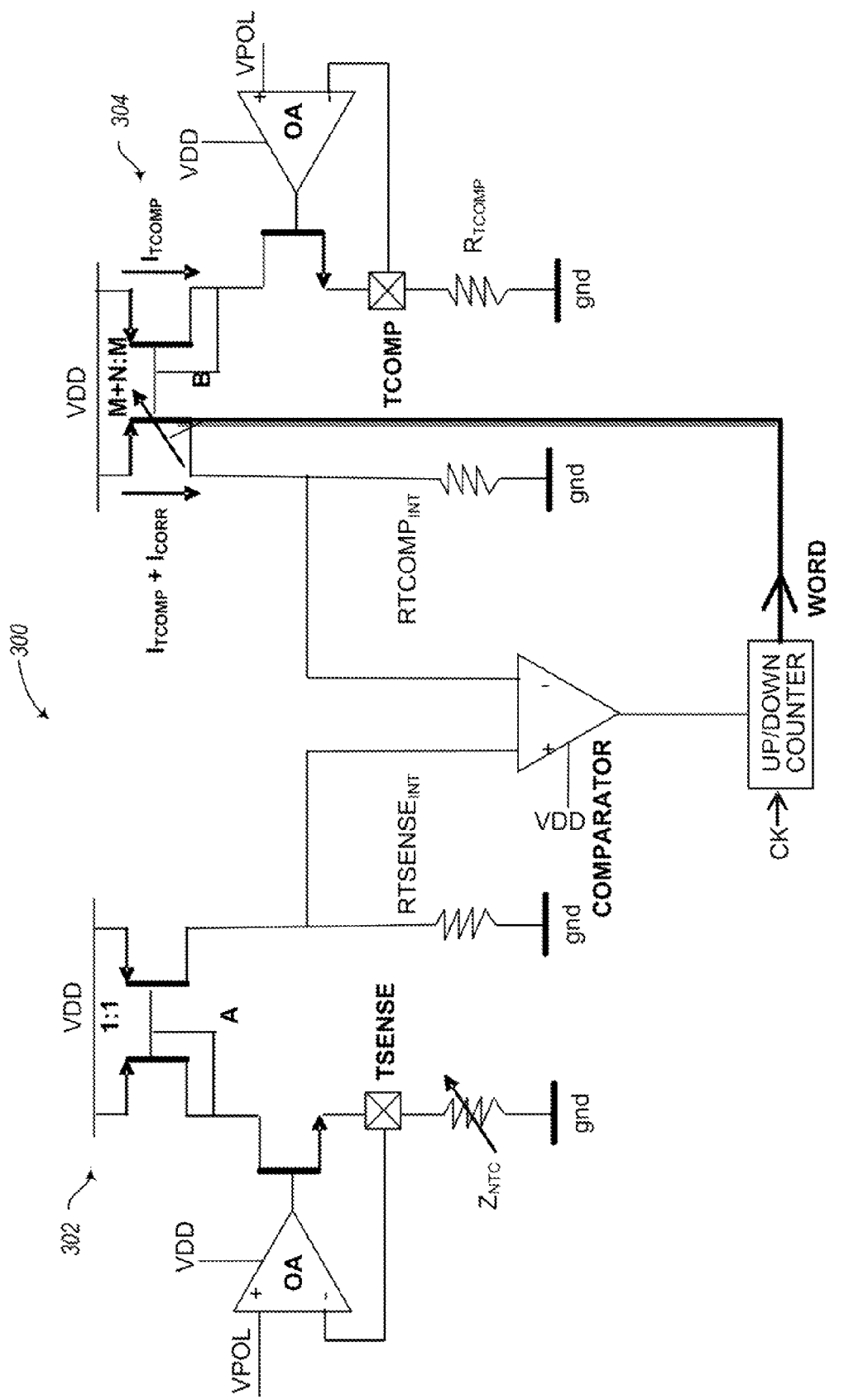
FIG. 3 depicts a digital embodiment of a sensing device adapted to generate an output signal representing temperature differences between the temperature of an environment and a reference temperature.

A detailed scheme of an embodiment of a sensing device 300 is depicted in FIG. 3. It comprises a first circuit 302 adapted to apply a constant voltage VPOL on the thermistor $Z_{NTC}$, connected to a terminal TSENSE of the device. The first circuit includes an operational amplifier OA and a current mirror A that receives the current flowing throughout the thermistor and mirrors it throughout a first sense resistor $RTSENSE_{INT}$ of the first circuit.

Assuming that the resistance ZNTC of the thermistor varies with the temperature T of the environment in which the thermistor is immersed according to the following equation:

$$Z_{NTC}=Z_{REF}\cdot(1+\beta\cdot(T-T_{REF}))$$

wherein $Z_{REF}$ is the resistance of the thermistor at a reference temperature $T_{REF}$ and $\beta$ is a temperature coefficient, and assuming that the mirror ratio of the first current mirror A is equal to 1, then the voltage $VTSEN_{INT}$ on the first sense resistor $RTSENSE_{INT}$ is:

$$VTSEN_{INT} = \frac{VPOL}{Z_{REF}\cdot(1+\beta\cdot(T-T_{REF}))} \cdot RTSEN_{INT}.$$

The sensing device comprises a second circuit 304, substantially similar to the first circuit, adapted to apply the constant voltage VPOL on a reference resistor $R_{TCOMP}$ connected to another terminal TCOMP of the device, including a second current mirror B, with adjustable mirroring ratio, that mirrors throughout a second sense resistor $RTCOMP_{INT}$ the current flowing through the reference resistor $R_{TCOMP}$.

The second current mirror B is adapted to adjust its mirroring ratio (M+N)/M in function of a control signal, that in the depicted architecture is the output signal WORD of the device. Such adjustable current mirrors are well known in the art and any of them may constitute the second current mirror B. Merely as non limiting exemplary embodiments, the current mirror B may be realized as disclosed in documents U.S. Pat. No. 6,700,365 or US 2002/0140412.

The voltage on the second sense resistor $RTCOMP_{INT}$ is:

$$VTCOMP_{INT} = RTCOMP_{INT} \cdot \frac{M+N}{M} \cdot \frac{VPOL}{RTCOMP}$$

The two voltages $VTCOMP_{INT}$ and $VTSEN_{INT}$ are compared by a comparator that generates a logic signal the value of which depends on the comparison.

An up-down counter counts pulses of a clock signal CK and increases or decreases the counting depending on the logic value of the logic comparison signal. The digital signal WORD increases or decreases the mirroring ratio of the second current mirror B such to make it correspond to the counting. In practice, when the voltage on the first sense resistor $RTSENSE_{INT}$ is greater than the voltage on the second sense resistor $RTCOMP_{INT}$, the mirroring ratio (M+N)/M is increased, and vice versa in the opposite case.

The sensing device acts such to make the voltages on the two sense resistors equal to each other:

$$VTCOMP_{INT}=VTSEN_{INT}$$

that is $$\frac{N}{M} = \frac{RTSEN_{INT}}{Z_{REF}\cdot(1+\beta\cdot(T-T_{REF}))} \cdot \frac{RTCOMP}{RTCOMP_{INT}} - 1$$

The increment N/M of the mirroring ratio, that corresponds to the digital signal WORD representing the counting, is determined by the temperature difference $T-T_{REF}$. Therefore the digital signal WORD output by the sensing device represents the difference $T-T_{REF}$ between the temperature of the environment in which the thermistor is immersed and the reference temperature $T_{REF}$.

By matching the two sense resistors $$RTCOMP_{INT}=RTSEN_{INT}$$

and making the reference resistor equal to the resistance $Z_{REF}$ of the thermistor at the reference temperature $T_{REF}$, then $$\frac{N}{M} = \frac{1}{1+\beta\cdot(T-T_{REF})} - 1$$

and thus $$T = T_{REF} - \frac{N}{M}\cdot\frac{1}{\beta}$$

The accuracy of the temperature measurement is $$\frac{1}{M\cdot\beta},$$

thus the herein proposed sensing device may be made very accurate by choosing a relatively great M and by choosing a thermistor with a relatively great $\beta$.

If a NTC (Negative Temperature Coefficient) thermistor is used, then the coefficient β is negative.

A relevant simplification may be obtained by choosing the value of β such that its reciprocal 1/β is equal to M or to a multiple thereof. Indeed, by choosing $$M = -\frac{1}{\beta}$$

the temperature T of the environment is given by a sum:

$$T = T_{REF} + N$$

thus it is not necessary to calculate any division, that would be relatively onerous from a computational point of view and time consuming.

The clock CK may generally have any frequency. In an embodiment, such a frequency may be determined depending on the expected maximum speed of variation of the temperature of the thermistor.

As an option, the sensing device may be equipped with an output register for distributing the output signal representing the sensed temperature difference to other circuits.

The herein disclosed sensing device may be used in switching regulators, in which the delivered current is sensed by exploiting the DC resistance DCR of the winding(s), for compensating the effects of temperature fluctuation of the winding(s) during the functioning of the regulator. This may be done by thermally coupling the thermistor with the winding(s) of the switching regulator.

Figure 4:
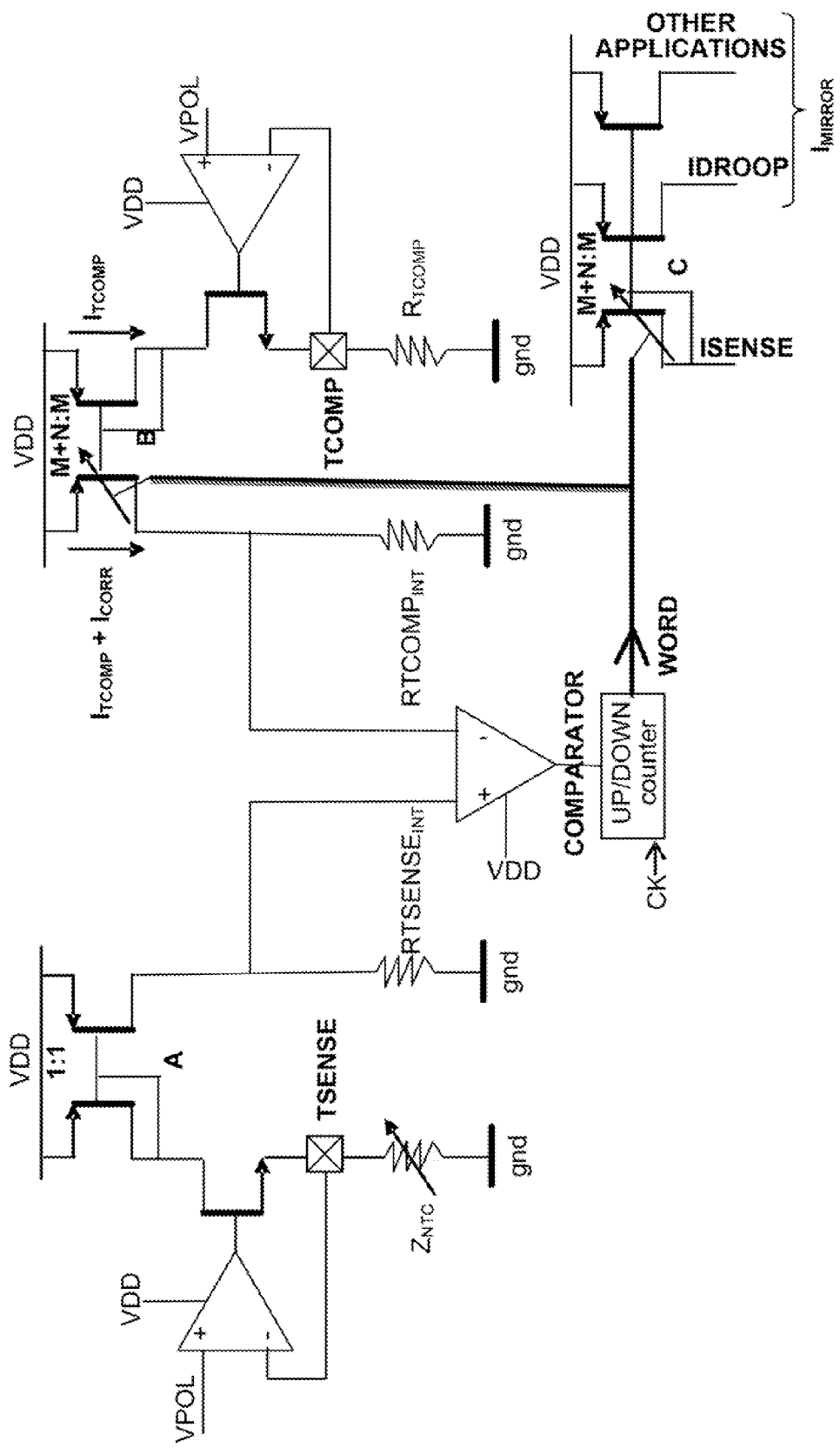
FIG. 4 shows an embodiment of a system employing an embodiment of a sensing device for generating a temperature-compensated droop current in a switching voltage regulator.

The digital signal WORD generated by the sensing device may be used to adjust the mirroring ratio of another current mirror with adjustable mirroring ratio (M+N)/M, as shown in FIG. 4, input with a sense current ISENSE that should be proportional by a factor $K_{SENSE}$ to the current $I_L$ flowing throughout a winding of a switching regulator, and generating a corresponding "droop" current IDROOP.

The current ISENSE is substantially proportional to the voltage drop on a winding or windings of the switching regulator, thus it increases when the functioning temperature of the winding(s) increases. Being α the temperature coefficient of the winding(s), that are typically made of copper (thus α≅0.39%), and being IL the current to be sensed throughout the winding(s), then $$ISENSE = K_{SENSE} \cdot I_L \cdot (1 + \alpha \cdot (T - T_{REF}))$$

In order to make the current IDROOP less dependent from this functioning temperature, the mirroring ratio of the current mirror C is adjusted such to reduce the ratio M/(M+N) when the temperature increases. Being $$1 + \beta \cdot (T - T_{REF}) = \frac{M}{M + N}$$

the current IDROOP may be substantially temperature independent by connecting to the terminal IMON a network containing a thermistor such that the equivalent temperature coefficient β of the network is $$\beta = -\frac{\alpha}{\alpha \cdot (T - T_{REF}) + 1}$$

If only a linearly temperature dependent network is available, it is possible to design such a network such to make the current IDROOP practically independent from temperature in a temperature range of interest.

As an alternative, it is possible to satisfy the above equation at a typical working temperature $T_W$ of the winding(s) of the switching regulator.

For example, a linearly temperature dependent network, connected to the terminal IMON, having a resistance equal to RTCOMP at the reference temperature $T_{REF}$ and a resistance $$RTCOMP \cdot [1 + \beta_W \cdot (T_W - T_{REF})]$$

at the working temperature $T_W$, with $$\beta_W = -\frac{\alpha}{\alpha \cdot (T_W - T_{REF}) + 1}$$

would allow to generate at the working temperature $T_W$ a current IDROOP with the same value that it would have if the winding of the regulator was at the reference temperature $T_{REF}$.

Techniques for realizing linearly temperature dependent networks with a desired temperature coefficient β and with a desired resistance RTCOMP at the reference temperature $T_{REF}$ are well known in the art and for this reason the realization of such networks will not be discussed further herein.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensing device, comprising:
   circuitry configured to apply a voltage to a thermistor;
   a first sense resistor;
   a first current mirror configured to mirror a first current flowing through the thermistor through said first sense resistor;
   circuitry configured to apply said voltage to a reference resistor;
   a second sense resistor;
   a second current mirror configured to mirror a second current flowing through the reference resistor through said second sense resistor;
   a comparator configured to compare voltages on said first and second sense resistors to generate a comparison signal; and
   output circuitry configured to receive the comparison signal and to generate an output signal representative of a difference between a temperature of an environment of the thermistor and a reference temperature, wherein a mirroring ratio of the second current mirror is configured to vary based on the output signal.

2. The sensing device of claim 1 wherein the output circuitry comprises an up-down counter configured to receive a clock signal and to increase or decrease a count based on clock pulses and a value of the comparison signal.

3. The sensing device of claim 2 wherein said first and second sense resistors are substantially identical to each other and said reference resistor has a resistance matching a resistance of said thermistor at said reference temperature.

4. The sensing device of claim 1 wherein said circuitry configured to apply the voltage to the thermistor comprises:
   a first operational amplifier configured to receive a constant voltage and a first feedback voltage available on a first terminal configured to couple to the thermistor; and
   a first transistor controlled in a conduction state by said first operational amplifier and coupled between the first current mirror and the first terminal.

5. The sensing device of claim 4 wherein said circuitry configured to apply the voltage to the reference resistor comprises:
   a second operational amplifier configured to receive said constant voltage and a second feedback voltage available on a second terminal configured to coupled to said reference resistor; and
   a second transistor controlled in a conduction state by said second operational amplifier and coupled between the second current mirror and the second terminal.

6. The sensing device of claim 5 wherein the output circuitry comprises an up-down counter configured to receive a clock signal and to increase or decrease a count based on clock pulses and a value of the comparison signal.

7. The sensing device of claim 6 wherein the comparison signal is a logic signal.

8. The sensing device of claim 1 wherein a mirroring ratio of the first current mirror is 1 to 1.

9. The sensing device of claim 1, further comprising:
   a third current mirror having a mirroring ratio configured to vary based on the output signal.

10. A method, comprising:
    applying a voltage to a thermistor in an environment;
    mirroring a first current flowing through said thermistor to a first sense resistor;
    applying a voltage to a reference resistor;
    mirroring a second current flowing through the reference resistor to a second sense resistor;
    comparing the voltages on said first and second sense resistors and generating a comparison signal;
    generating a signal representative of a difference between a temperature of the environment and a reference temperature based on the comparison; and
    adjusting a mirroring ratio of said second current based on said signal representative of the temperature difference.

11. The method of claim 10 wherein the comparison signal is a logic signal and the generating the signal representative of the temperature difference comprises incrementing or decrementing a counter based on the logic signal and a clock signal.

12. The method of claim 11 wherein said first and second sense resistors are substantially identical to each other and said reference resistor has a resistance equal to a resistance of said thermistor at said reference temperature.

13. The method of claim 10 wherein said applying the voltage to the thermistor comprises:
    applying a constant voltage and a first feedback voltage to a first operational amplifier, wherein the first feedback voltage is a voltage across the thermistor; and
    applying an output of the first operational amplifier to control a first transistor coupled between the first current mirror and the thermistor.

14. The method of claim 13 wherein said applying the voltage to the reference resistor comprises:
    applying the constant voltage and a second feedback voltage to a second operational amplifier, wherein the second feedback voltage is a voltage across the reference resistor; and
    applying an output of the second operational amplifier to control a second transistor coupled between the second current mirror and the reference resistor.

15. The method of claim 14 wherein the comparison signal is a logic signal and the generating the signal representative of the temperature difference comprises incrementing or decrementing a counter based on the logic signal and a clock signal.

16. The method of claim 10, further comprising controlling a voltage regulator based on the signal representative of the temperature difference.

17. The method of claim 16 wherein the controlling the voltage regulator comprising generating a droop current based on the signal representative of the temperature difference and a sensed current provided by the voltage regulator.

18. A system, comprising:
    a voltage regulator having an inductor;
    a thermistor thermally coupled to the inductor; and
    a sensing device coupled to the voltage regulator and including:
      circuitry configured to apply a voltage to the thermistor;
      a first sense resistor;
      a first current mirror configured to mirror a first current flowing through the thermistor through said first sense resistor;
      circuitry configured to apply said voltage to a reference resistor;
      a second sense resistor;
      a second current mirror configured to mirror a second current flowing through the reference resistor through said second sense resistor;
      a comparator configured to compare voltages on said first and second sense resistors to generate a comparison signal; and
      output circuitry configured to receive the comparison signal and to generate an output signal representative of a difference between a temperature of the environment and a reference temperature, wherein a mirroring ratio of the second current mirror is configured to vary based on the output signal.

19. The system of claim 18 wherein the comparison signal is a logic signal and the output circuitry comprises an up-down counter configured to receive a clock signal and to increase or decrease a count based on clock pulses and a value of the comparison signal.

20. The system of claim 19 wherein said first and second sense resistors are substantially identical to each other and said reference resistor has a resistance matching a resistance of said thermistor at said reference temperature.

21. The system of claim 20 wherein:
said circuitry configured to apply the voltage to the thermistor comprises:
  a first operational amplifier configured to receive a constant voltage and a first feedback voltage available on a first terminal configured to couple to the thermistor; and
  a first transistor controlled in a conduction state by said first operational amplifier and coupled between the first current mirror and the first terminal; and
said circuitry configured to apply the voltage to the reference resistor comprises:
  a second operational amplifier configured to receive said constant voltage and a second feedback voltage available on a second terminal configured to coupled to said reference resistor; and
  a second transistor controlled in a conduction state by said second operational amplifier and coupled between the second current mirror and the second terminal.

22. The system of claim 18, comprising:
a third current mirror having a mirroring ratio configured to vary based on the output signal.

23. The system of claim 22 wherein the third current mirror is configured to mirror a sensed current representative of a current flowing through the voltage regulator.

24. The system of claim 23 wherein the sensed current is representative of a current flowing through the inductor.

25. The system of claim 23 wherein the sensed current is representative of a current supplied by the voltage regulator to a load.

26. The system of claim 25 wherein the third current mirror is configured to generate a droop current to control the voltage regulator.

27. The system of claim 26 wherein the mirroring ratio of the third current mirror is a reciprocal of the mirroring ratio of the second current mirror.

28. A system, comprising:
means for generating a first signal based on a current flowing through a thermistor;
means for generating a second signal based on a current flowing through a reference resistor;
means for generating a comparison signal based on the first and second signals; and
means for generating a control signal to control a mirroring ratio of the means for generating the second signal based on the comparison signal, wherein the control signal is indicative of a temperature difference.

29. The system of claim 28, further comprising:
a voltage regulator; and
means for generating a droop current based on the control signal and a current representative of a current provided by the voltage regulator.

30. The system of claim 28 wherein the temperature difference is a difference between a temperature of an environment of the voltage regulator and a reference temperature.

* * * * *